2,939,875
PREPARATION OF 2-CHLOROETHYL THIOCYANATE

Vernon Deane Floria, Midland, Mich., assignor to The Dow Chemical Company, Midland, Mich., a corporation of Delaware No Drawing. Filed Mar. 10, 1958, Ser. No. 720,084

8 Claims. (Cl. 260—454)

This invention concerns a method for making 2-chloroethyl thiocyanate.

In accordance with this invention, it has been discovered that 2-chloroethyl thiocyanate can be readily prepared using relatively inexpensive reagents by heating a mixture of proportions between about ¼ and 3 moles of an ammonium or alkali metal thiocyanate and one mole of bis-(2-chloroethyl) sulfate at a temperature between about 80° and 130° C., advantageously in the presence of a neutralizing amount of an alkali metal- or alkaline earth metal-hydroxide, bicarbonate or carbonate, and distilling off and recovering product 2-chloroethyl thiocyanate at subatmospheric pressure.

In the formation of 2-chloroethyl thiocyanate by reaction between an alkali metal or ammonium thiocyanate and bis-(2-chloroethyl) sulfate, any alkali metal thiocyanate can be used. It is preferred, however, to use an alkali metal thiocyanate such as sodium or potassium thiocyanate or ammonium thiocyanate for economic reasons. A reaction temperature ranging between about 80° and 130° C. is operable, the higher temperatures giving faster reaction rates. Below 80° C., the rate of formation of 2-chloroethyl thiocyanate is too slow to be economic, while above 130° C. decomposition takes place. A reaction temperature between 90° and 130° C. is generally preferred. The reaction can be carried out by heating the anhydrous reactants per se, in the presence of a non-reactive hydrocarbon or substituted hydrocarbon diluent, e.g., benzene, toluene, xylene, o-dichlorobenzene, nitrobenzene, carbon tetrachloride, chloroethyl ether, ethanol, etc., or in aqueous medium. Ethanol and toluene are preferred diluents.

The following examples are given in illustration of the invention and not in limitation thereof.

*Example 1.—Preparation of 2-chloroethyl thiocyanate from anhydrous KSCN and bis-(2-chloroethyl) sulfate*

A quantity of 62 grams (0.6 mole) of anhydrous potassium thiocyanate mixed with 10 grams of anhydrous sodium carbonate was stirred into 100 grams (0.45 mole) of bis-(2-chloroethyl) sulfate at room temperature. The mixture was heated to 80° C. for ½ hour. The pot temperature was then increased to 120° to 130° C. and distillation was begun. A quantity of 40 grams of product, identified by infrared analysis as 2-chloroethyl thiocyanate was recovered. It had a boiling point of 96° C. at 10–12 mm. Hg. A yield of 73 percent was obtained, based on sulfate present. The reaction rate can be accelerated by increasing the reaction temperature up to 130° C.

*Example 2.—Preparation of 2-chloroethyl thiocyanate from anhydrous NH₄SCN and bis-(2-chloroethyl) sulfate*

A quantity of 100 grams of bis-(2-chloroethyl) sulfate was heated to 90° C. in a 250 ml. 3-necked flask attached to a distillation head. A quantity of 2 grams of sodium carbonate was added to neutralize acid impurities. At an absolute pressure of 2 mm. of Hg, 10 grams of chloroethyl ether impurity was distilled off. A quantity of 38 grams of ammonium thiocyanate was then added over a period of 1.5 hours. An amount of 36 grams of 2-chloroethyl thiocyanate was recovered having a boiling range of 55°–60° C. at 1.5 mm. Hg. A yield of 73 percent was obtained, based on the sulfate present. The reaction rate can be accelerated by increasing the reaction temperature to 130° C. Above 130° C. decomposition of the desired product takes place.

*Example 3.—Preparation of 2-chloroethyl thiocyanate in aqueous medium*

A quantity of 10 grams (0.132 mole) of ammonium thiocyanate, 15 ml. of water and 27.2 grams (0.123 mole) of bis-(2-chloroethyl) sulfate was charged into a 50 ml. flask equipped for steam distillation. The mixture was heated to 100° C. Steam distillation began within one hour. The distillate temperature ranged from 70° to 85° C. After 6 hours, the heavy oil layer was separated, dried, and distilled. There was recovered 9 grams (0.075 mole) of 2-chloroethyl thiocyanate, boiling at 50°–53° C. at 0.8 mm. Hg. The yield was 61 percent of theory.

*Example 4.—Preparation of 2-chloroethyl thiocyanate in ethanol medium*

A quantity of 0.3 gram mole of potassium thiocyanate, 170 ml. of benzene-denatured absolute alcohol and 0.222 gram mole of bis-(2-chloroethyl) sulfate was refluxed for 3 hours. Vacuum distillation gave a yield of 70 percent of 2-chloroethyl thiocyanate, based on sulfate present.

*Example 5.—Preparation of 2-chloroethyl thiocyanate in toluene medium*

A quantity of 0.4 gram mole of potassium thiocyanate, 100 ml. of toluene and 0.1 gram mole of bis-(2-chloroethyl) sulfate was refluxed for 2.5 hours. A 25 percent yield of 2-chloroethyl thiocyanate was obtained by vacuum distillation, based on sulfate present.

*Example 6.—Preparation of 2-chloroethyl thiocyanate in CCl₄ medium*

The procedure of Example 5 was repeated, substituting 100 ml. of $CCl_4$ for the toluene then used. An 18 percent yield of 2-chloroethyl thiocyanate was obtained by vacuum distillation, based on sulfate present.

What is claimed is:

1. A method for making 2-chloroethyl thiocyanate, which method comprises reacting at a temperature between 80° and 130° C., a mixture of between ¼ and 3 molar proportions of a thiocyanate of the group consisting of ammonium and alkali metal thiocyanates and one mole of bis-(2-chloroethyl) sulfate and recovering 2-chloroethyl thiocyanate product.

2. A method for making 2-chloroethyl thiocyanate, which method comprises reacting at a temperature between 80° and 130° C., a mixture of between ¼ and 3 molar proportions of a thiocyanate of the group consisting of ammonium and alkali metal thiocyanates and one mole of bis-(2-chloroethyl) sulfate and fractionally distilling and recovering 2-chloroethyl thiocyanate product.

3. The method of claim 2 wherein the thiocyanate reactant is ammonium thiocyanate.

4. The method of claim 2 wherein the thiocyanate reactant is potassium thiocyanate.

5. The method of claim 1 wherein the reaction is carried out in an ethanol medium.

6. The method of claim 2 wherein the reaction is carried out in an aqueous medium.

7. The method of claim 2 wherein the reaction is carried out in a toluene medium.

8. The method of claim 2 wherein the reaction is carried out in a carbon tetrachloride medium.

References Cited in the file of this patent

UNITED STATES PATENTS 1,992,533    Lee  ---------------- Feb. 26, 1935

OTHER REFERENCES

Noller: "Chemistry of Organic Compounds," 1951, page 312.